US 8,543,767 B2

(12) United States Patent
Bell et al.

(10) Patent No.: US 8,543,767 B2
(45) Date of Patent: Sep. 24, 2013

(54) PREFETCHING WITH MULTIPLE PROCESSORS AND THREADS VIA A COHERENCY BUS

(75) Inventors: Gordon B. Bell, Madison, WI (US); Gordon T. Davis, Chapel Hill, NC (US); Jeffrey H. Derby, Chapel Hill, NC (US); Anil Krishna, Cary, NC (US); Srinivasan Ramani, Cary, NC (US); Ken Vu, Cary, NC (US); Steve Woolet, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/488,215

(22) Filed: Jun. 4, 2012

(65) Prior Publication Data
US 2012/0246406 A1 Sep. 27, 2012

Related U.S. Application Data

(62) Division of application No. 12/192,072, filed on Aug. 14, 2008, now Pat. No. 8,200,905.

(51) Int. Cl.
G06F 13/00 (2006.01)
(52) U.S. Cl.
USPC ............. 711/137; 711/121; 711/124; 710/22; 712/237
(58) Field of Classification Search
USPC ............ 711/137, 121, 124; 710/22; 712/237
See application file for complete search history.

(56) References Cited

U.S. PATENT DOCUMENTS

| 5,551,001 | A | 8/1996 | Cohen et al. |
| 5,758,119 | A | 5/1998 | Mayfield et al. |
| 5,761,706 | A | 6/1998 | Kessler et al. |
| 6,098,154 | A | 8/2000 | Lopez-Aguado et al. |
| 6,397,296 | B1 | 5/2002 | Werner |
| 6,460,115 | B1 | 10/2002 | Kahle et al. |
| 6,574,712 | B1 | 6/2003 | Kahle et al. |

(Continued)

FOREIGN PATENT DOCUMENTS

| JP | 10143476 | 5/1998 |
| JP | 11328018 | 11/1999 |
| KR | 20020042077 | 6/2002 |

OTHER PUBLICATIONS

Sinharoy et al., "IBM Power5 Chip: A Dual-Core Multithreaded Processor", IEEE Computer Society, vol. 24, No. 2, Mar.-Apr. 2004, pp. 40-47.

(Continued)

Primary Examiner — Hong Kim
(74) Attorney, Agent, or Firm — Yee & Associates, P.C.; Matthew C. Zehrer

(57) ABSTRACT

A processing system includes a memory and a first core configured to process applications. The first core includes a first cache. The processing system includes a mechanism configured to capture a sequence of addresses of the application that miss the first cache in the first core and to place the sequence of addresses in a storage array; and a second core configured to process at least one software algorithm. The at least one software algorithm utilizes the sequence of addresses from the storage array to generate a sequence of prefetch addresses. The second core issues prefetch requests for the sequence of the prefetch addresses to the memory to obtain prefetched data and the prefetched data is provided to the first core if requested.

6 Claims, 7 Drawing Sheets

(56) References Cited

U.S. PATENT DOCUMENTS

| | | | |
|---|---|---|---|
| 6,697,916 | B2 | 2/2004 | Lasserre et al. |
| 7,124,252 | B1* | 10/2006 | Khare et al. ............. 711/137 |
| 7,296,140 | B2 | 11/2007 | Sprangle et al. |
| 7,330,940 | B2 | 2/2008 | Bockhaus et al. |
| 7,493,451 | B2 | 2/2009 | Kadambi et al. |
| 7,730,263 | B2 | 6/2010 | Burtscher et al. |
| 7,865,570 | B2 | 1/2011 | Sun |
| 7,895,399 | B2 | 2/2011 | Tomita et al. |
| 8,079,031 | B2 | 12/2011 | Santhanakrishnan et al. |
| 8,200,905 | B2 | 6/2012 | Bell et al. |
| 2002/0087766 | A1 | 7/2002 | Kumar et al. |
| 2004/0193754 | A1 | 9/2004 | Kahle |
| 2006/0117145 | A1 | 6/2006 | Sprangle et al. |
| 2006/0179236 | A1 | 8/2006 | Shafi |
| 2007/0067382 | A1 | 3/2007 | Sun |
| 2007/0094453 | A1 | 4/2007 | Santhanakrishnan et al. |
| 2007/0174555 | A1* | 7/2007 | Burtscher et al. ............. 711/137 |
| 2007/0294482 | A1 | 12/2007 | Kadambi et al. |
| 2008/0059715 | A1 | 3/2008 | Tomita et al. |
| 2008/0104328 | A1 | 5/2008 | Yoshikawa et al. |
| 2010/0042786 | A1 | 2/2010 | Bell et al. |

OTHER PUBLICATIONS

Palacharla et al., "Evaluating Stream Buffers as a Secondary Cache Replacement", Proceedings of the 21st Annual International Symposium on Computer Architecture, Chicago, Illinois, USA, Apr. 1994, pp. 24-33.

Joseph et al., "Prefetching Using Markov Predictors", Proceedings of the 24th Annual International Symposium on Computer Architecture, Denver, Colorado, USA, Jun. 2-4, 1997, pp. 252-263.

Cooksey et al., "A Stateless, Content-Directed Data Prefetching Mechanism", Proceedings of the 10th International Conference on Architectural Support for Programming Languages and Operating Systems, San Jose, California, USA, Oct. 5-9, 2002, 25 pages.

Olukotun et al., "The Case for a Single-Chip Multiprocessor", Proceedings of the Seventh International Conference on Architectural Support for Programming Languages and Operating Systems, Cambridge, Massachusetts, USA, Oct. 1-5, 1996, pp. 2-11.

Lai et al., "Dead-Block Prediction & Dead-Block Correlating Prefetchers", Proceedings of the 28th Annual International Symposium on Computer Architecture, Goteborg, Sweden, Jun. 30-Jul. 4, 2001, pp. 1-11.

Collins et al., "Dynamic Speculative Precomputation", Proceedings of the 34th Annual International Symposium on Microarchitecture, Austin, Texas, USA, Dec. 2001, pp. 306-317.

Marty et al., "Virtual Hierarchies to Support Server Consolidation", Proceedings of the 34th Annual International Symposium on Computer Architecture, San Diego, California, USA, Jun. 9-13, 2007, pp. 1-11.

Kongetira et al., "Niagara: A 32-Way Multithreaded Sparc Processor", Sun Microsystems, IEEE Micro, vol. 25, No. 2, Mar. 2005, pp. 21-29.

Tendler et al., "Power4 System Microarchitecture", IBM Journal of Research and Development, vol. 46, No. 1, Jan. 2002, pp. 5-25.

Ganusov et al., "Efficient Emulation of Hardware Prefetchers via Event-Driven Helper Threading", PACT'06, Seattle, Washington, USA, Sep. 16-20, 2006, pp. 144-153.

Sudeep Kumar Ghosh, "Unobtrusive Reactive Prefetching: A Multicore Approach for Exploiting Hot Streams in Cache Misses", pp. 1-9, retrieved on Aug. 13, 2008, <http://www.cs.virginia.edu/~skg5n/pact07-snoop.pdf>.

Alameldeen et al., "Interactions Between Compression and Prefetching in Chip Multiprocessors", 13th International Symposium on High Performance Computer Architecture, Phoenix, Arizona, USA, Feb. 10-14, 2007, pp. 228-239.

Roth et al., "Speculative Data-Driven Multithreading", 7th International Symposium on High Performance Computer Architecture, Nuevo Leone, Mexico, Jan. 20-24, 2001, pp. 37-48.

Fu et al., "Stride Directed Prefetching in Scalar Processors", Proceedings of the 25th Annual International Symposium on Microarchitecture, Portland, Oregon, USA, Dec. 1992, pp. 102-110.

Mowry et al., "Tolerating Latency Through Software-Controlled Prefetching in Shared-Memory Multiprocessors", Journal of Parallel and Distributed Computing, vol. 12, Jun. 1991, 25 pages.

Guo et al., "A Framework for Providing Quality of Service in Chip Multi-Processors", Proceedings of the 40th Annual IEEE/ACM International Symposium on Microarchitecture, Chicago, Illinois, USA, Dec. 1-5, 2007, pp. 343-355.

Office Action issued on Sep. 30, 2011 for U.S. Appl. No. 12/192,072, 14 pages.

Response to Office Action filed on Dec. 20, 2011 for U.S. Appl. No. 12/192,072, 9 pages.

Notice of Allowance issued on Feb. 8, 2012 for U.S. Appl. No. 12/192,072, 10 pages.

* cited by examiner

PREFETCHING WITH MULTIPLE PROCESSORS AND THREADS VIA A COHERENCY BUS

This application is a divisional of application Ser. No. 12/192,072 filed Aug. 14, 2008, now U.S. Pat. No. 8,200,905 issued Jun. 12, 2012.

FIELD OF THE INVENTION

The present invention relates generally to a processing system and more particularly to providing improved memory latency in such systems.

BACKGROUND OF THE INVENTION

Technology differences continue to allow processors to be clocked at faster clocks while memory clock rate continues to grow at a much slower rate. This creates the well known processor-memory gap or the memory wall problem. As the processor-memory gap in computer systems continues to grow, techniques to hide the memory latency continue to be important. One of the most popular techniques to attack the memory wall problem is prefetching data into the caches before the processor needs the data. Several prefetching approaches have been studied in the past. These include hardware stream buffers, stride prefetching, correlation prefetching, software-based prefetch instruction support, content directed prefetching and helper thread based prefetching. Only very few of these techniques, primarily stream buffers and stride prefetchers, have been implemented in existing hardware, mainly because of the implementation difficulty and area overheads of the other schemes.

In addition to the increasing processor-memory-gap, another emerging trend in the microprocessor industry is that of chip multi processing, where multiple processor cores are built on a single ship. The process technology challenges, chip power constraints, and the difficulty in extracting instruction level parallelism (ILP) beyond a certain point from workloads are encouraging multiple, relatively simple cores to be stamped out on a single chip. CMPs can also be constructed from sophisticated processors, however, there is a developing trend to use small, simple, potentially, in-order cores. The reason for this is that the area, power and design cost of extracting greater ILP using sophisticated processors is being overcome by the benefit of better TLP (thread level parallelism) and performance per watt possible by multiple, albeit simple, cores on a single chip, for example—Niagara and Niagara 2 from Sun Microsystems. It is often argued that this CMP trend minimizes the impact of the processor-memory gap by allowing the system to hide the latency of accessing memory for one application by simply making progress on another, running on a different core on the CMP. However, single threaded performance continues to be important. Indeed, another recent trend in the microprocessor industry is virtualization within a CMP and providing Quality of Service (QOS) guarantees to applications running on CMPs.

The above argument regarding thread-level parallelism, and the effect it has on the benefit of prefetching, applies to any computer system with multiple hardware threads running simultaneously, for example, multithreaded cores using Simultaneous Multi Threading, Fine Grain Multithreading or Coarse Grain Multithreading techniques) and multiprocessor systems (using Symmetric Multi Processing techniques). The performance of a single hardware thread might still be an important goal, even in a system where multiple hardware threads execute simultaneously, and, achieving good aggregate performance across multiple threads might not suffice.

Improving single threaded performance is especially hard in CMPs that employ simple processor cores because the cores do not implement many sophisticated ILP enhancing techniques. This is done to keep the area per core small. For example, cores in a CMP with many small cores might be in-order, narrow issue, without sophisticated branch prediction and with relatively small caches. In such a system shared memory bandwidth and shared cache space are precious resources. Prefetching is often not employed in such a scenario because stream buffers, stride prefetchers or content-directed prefetchers could place a heavy burden on the memory bandwidth by prefetching too aggressively or too far ahead. Additionally, if the prefetched data displaces useful existing data in the cache or if it remains unused during its lifetime in the cache, it causes cache pollution. If the prefetches fetch too far ahead of the demand stream the prefetched data gets evicted from the cache before it is used, and, thereby, waste bandwidth. It has been shown that stride-based prefetching, which helps improve performance significantly in a uniprocessor, becomes less effective as the number of processors in the chip grow, so much so that it can actually degrade performance.

Correlation prefetching schemes such as Markov Prefetching require a correlation table. The table can be very large (for example, as large as several MB off-chip RAM) and therefore is not used in CMPs. Typically, hardware prefetching schemes are good at tackling simple prefetch patterns, but are not flexible in adapting to the most effective prefetching scheme for an application. Also, hardware schemes tend to be aggressive in prefetching thereby using up the limited memory bandwidth. CMPs with many cores need to be able to adapt to a diverse set of applications which might benefit from an equally diverse set of prefetch algorithms. The prefetch algorithms in a CMP need to be sensitive to the memory bandwidth usage and be flexible in terms of how aggressive they are based on the system load.

Software based prefetching allows the prefetch algorithm to be tune application characteristics. In addition, since there are many cores available in a CMP, the algorithm could be run on a separate underutilized core. Therefore, for CMPs, software prefetching schemes seem to be quite attractive. Sophisticated software-based prefetch algorithms such as helper threads have been proposed for CMPs where an idle core on the CMP is used to run a skeleton of the main application thread such that only instructions leading to long-latency load instructions are executed in the helper thread. The helper thread, thus, becomes a tailor-made prefetch algorithm for the main application fetching precisely what the main thread needs, hopefully in The problem with a software prefetch algorithm is that to create the helper thread in hardware requires significant hardware logic and to generate it in software requires a sophisticated compiler and, potentially, a profile run. That is because the path the helper thread takes before getting to the long-latency load that it is trying to prefetch might depend on the input data, making it hard to generate without a profile run.

Accordingly, what is needed is a method and system for improving the memory latency that addresses the above-identified issues. The method and system should be adaptable, easily implemented and cost effective. The present invention addresses such a need.

SUMMARY OF THE INVENTION

A processing system is disclosed. The processing system includes a memory and a first core configured to process applications. The first core includes a first cache. The processing system includes a mechanism configured to capture a sequence of addresses of the application that miss the first cache in the first core and to place the sequence of addresses in a storage array; and a second core configured to process at least one software algorithm. The at least one software algorithm utilizes the sequence of addresses from the storage array to generate a sequence of prefetch addresses. The second core issues prefetch requests for the sequence of the prefetch addresses to the memory to obtain prefetched data and the prefetched data is provided to the first if requested.

BRIEF DESCRIPTION OF DRAWINGS

The present invention will become more fully understood from the detailed description given hereinafter and the accompanying drawing(s) given by way of illustration only, and thus are not intended as a definition of the limits or limitations of the present invention, and wherein.

DETAILED DESCRIPTION OF PREFERRED EMBODIMENTS

Figure 1A:
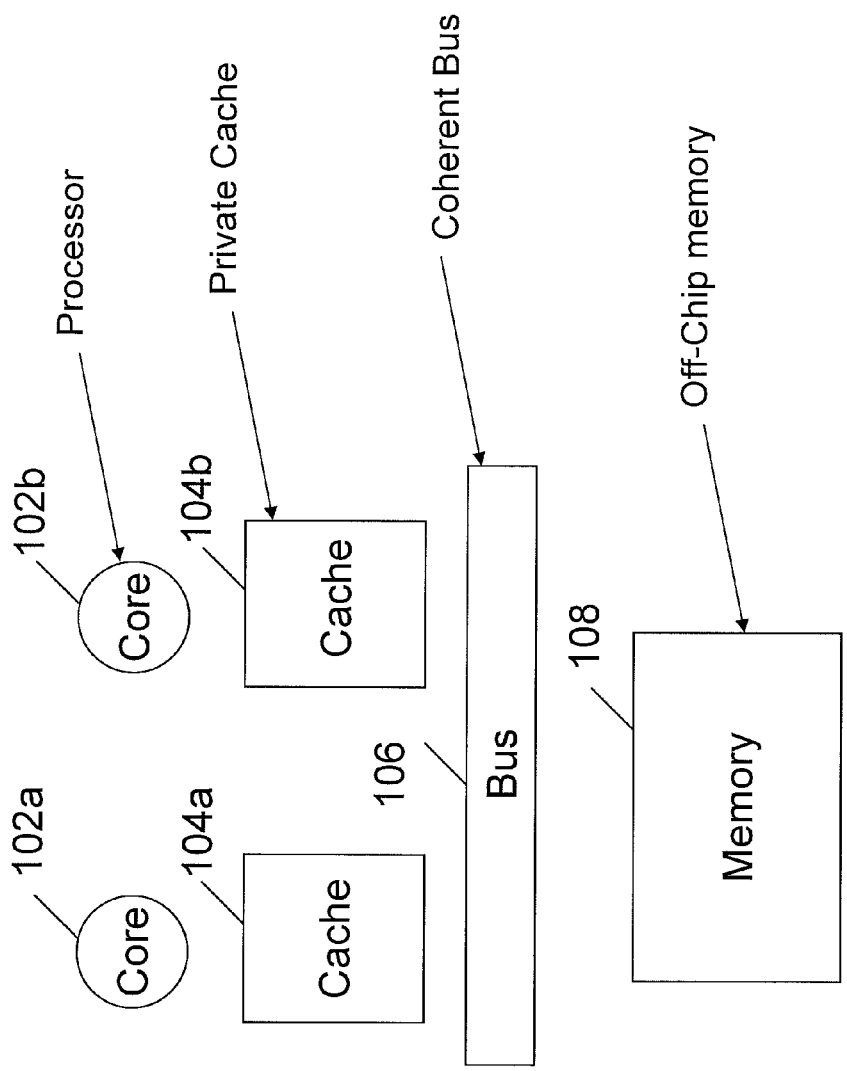
FIG. 1A is a simple block diagram of a processing system in accordance with an embodiment.

The present invention relates generally to a processing system and more particularly to providing to improve memory latency in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention addresses the problem of prefetching effectively in a computer system capable of running more than one hardware thread simultaneously, with a small hardware overhead, often without polluting the cache of the application thread and without needing a sophisticated compiler or profiling runs. To describe the features of the method and system in accordance with the present invention, refer now to the following description in conjunction with the accompanying figures.

In one embodiment, a computer system comprises of at least two processing elements, one processing element processes applications and the other processing element processes algorithms to assist the former processing element in optimizing memory access overhead. An example of an algorithm is one that maintains a correlation table of cache miss patterns seen from a given processing element in the past and using such history to predict future miss patterns. The system includes a facility that captures the sequence of addresses that miss in the cache for the first processing element and places them in a storage array that the second processing element can access. The second processing element runs one or more assist algorithms using the sequence of addresses from the storage array to generate a sequence of prefetch addresses. The second processing element issues prefetch requests for those prefetch addresses to the system memory and the prefetched data is provided to the first processing element in the event that it makes a request for that data.

In one embodiment, the prefetched data could be stored in a cache accessible to the processing element running the main application. This may be achieved by the prefetching processing element either by bringing the data into a level of cache that is shared by the two processing elements in question (such as a shared Level 3 cache), or, this may be achieved by the prefetching processing element bringing the prefetched data into a private cache that can then provide data to the processing element running the main application, for example, via data intervention. In addition, the processing element running the prefetch assist algorithm would preferably be an idle or under-utilized core.

In the preferred embodiment a core, preferably "nearest" to the core where the main application is to be scheduled, should be used for the purposes of running the prefetching thread. Here, what is meant by "nearest" is the core can be communicated with in the least amount of time. In a shared bus or cross bar interconnect architecture the distances between the cores on the chip may be identical, however, in a shared ring or network topology, the communication delays between the various cores might not be equal. In a different embodiment, a small subset of cores on a chip multiprocessing (CMP) system could be designated to be "snoop-based prefetching capable" and be used for the purposes of running prefetch algorithms. The advantage of the latter embodiment is that the extra hardware resources needed are restricted to a small set of cores rather than all cores in the CMP system, thereby reducing hardware logic and area overhead. In the latter embodiment these "snoop-based prefetching capable" cores should be evenly distributed across the chips, rather than laying them out in a concentrated fashion. The reasoning behind such a layout is that a core running a main thread should be able to use a "nearby" prefetching core so that the prefetched data can be quickly supplied to the main application.

FIG. 1A is a simple block diagram of a processing system 100 in accordance with an embodiment. The processing system 100 includes at least two processing elements or cores 102a and 102b. In this embodiment, each of the cores 102a and 102b has a private cache 104a and 104b, respectively, associated therewith. Each of the cores 102a and 102b communicates with system memory 108 via a coherent bus 106.

Figure 1B:
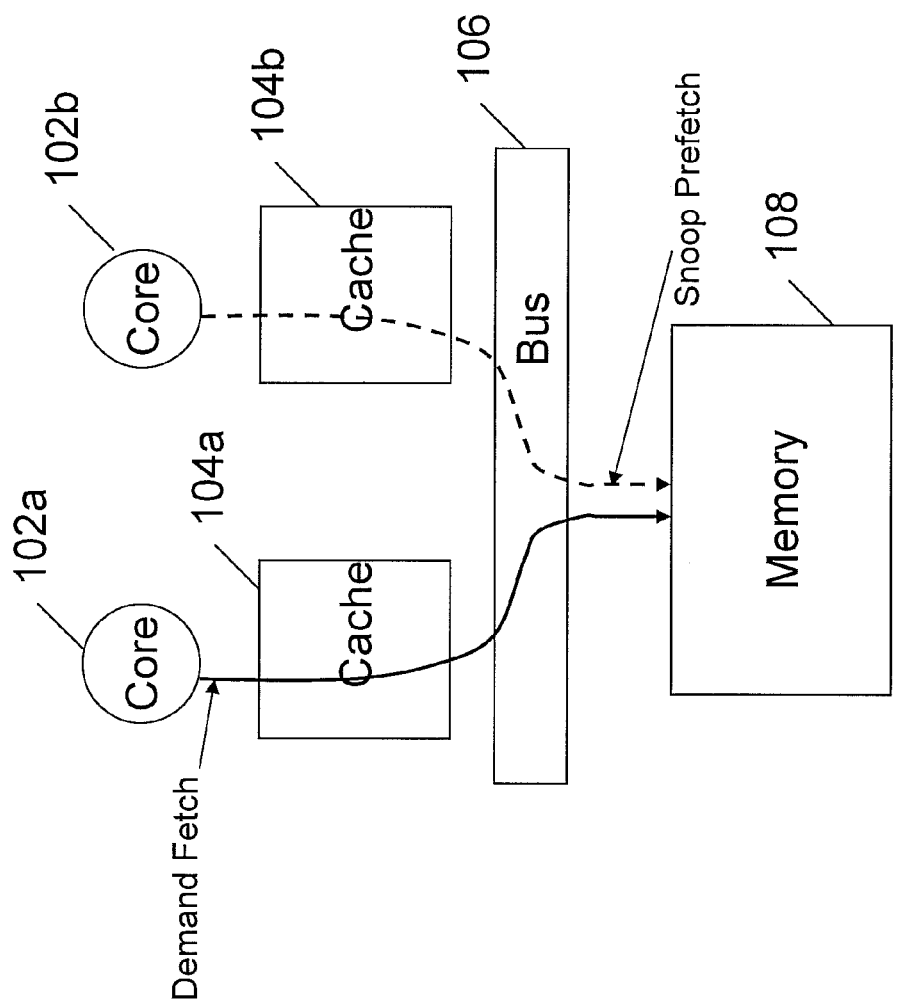
FIG. 1B illustrates the processing system while utilizing the prefetching mechanism in accordance with an embodiment.

FIG. 1B illustrates the processing system 100 while utilizing the prefetching mechanism in accordance with an embodiment. In this embodiment a core 102b is lightly utilized hence it effectively implements the prefetch algorithm or group of algorithms. Since the core is lightly utilized, the core; provide the following advantages; reduces cache contention; reduces bus contention (in terms of port-connection in a shared bus interconnect, and in terms of link-contention for other, non-shared-bus based interconnects); it is flexible; complex prefetching mechanisms can be implemented a library of algorithms can be chosen from.

Figure 1C:
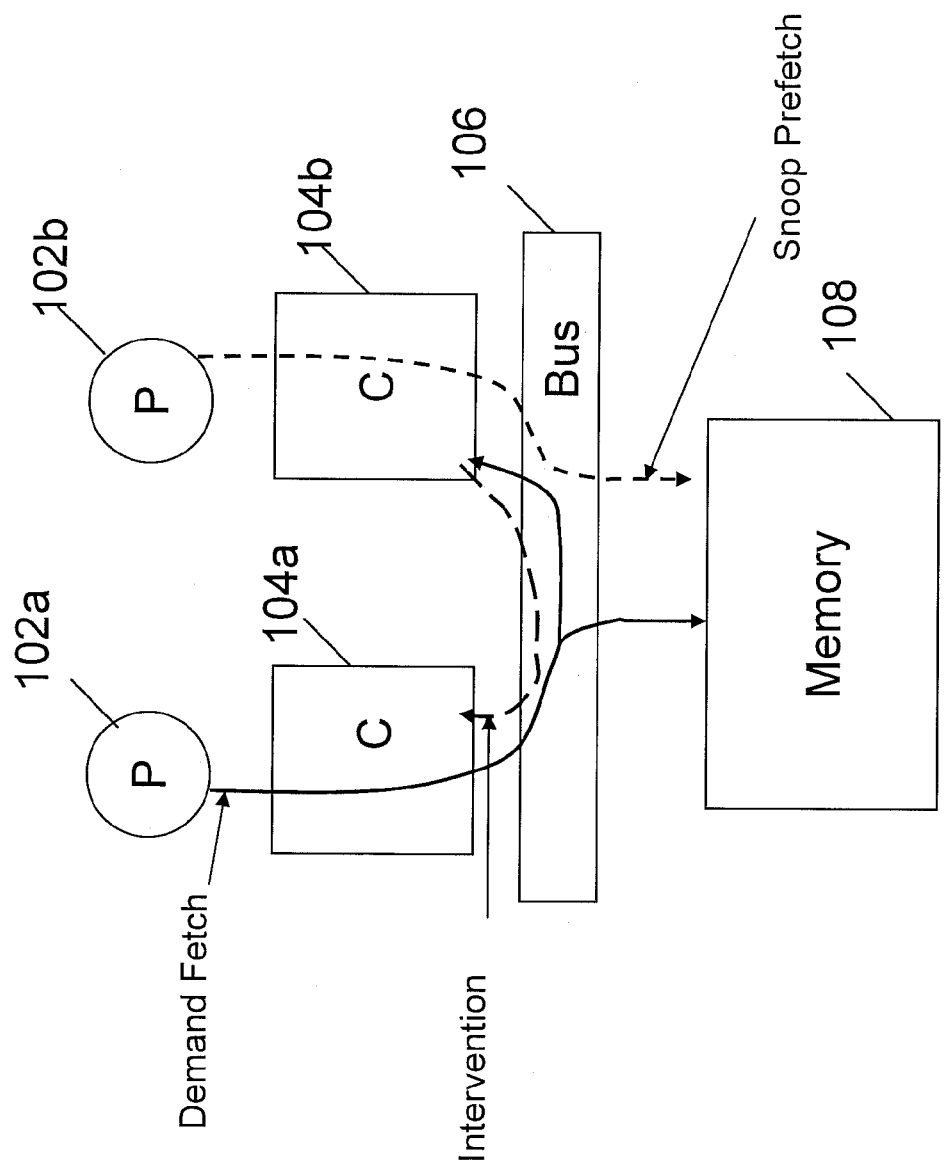
FIG. 1C shows a prefetching core/cache satisfying demand fetch (or other hardware prefetch requests) by intervention.

As shown in FIG. 1C, prefetching core/cache 102a/104a satisfies demand fetch (or other hardware prefetch requests)

by intervention. In addition, the prefetch algorithm also uses the demand fetch address to continue to guide its predictions.

Figure 1D:
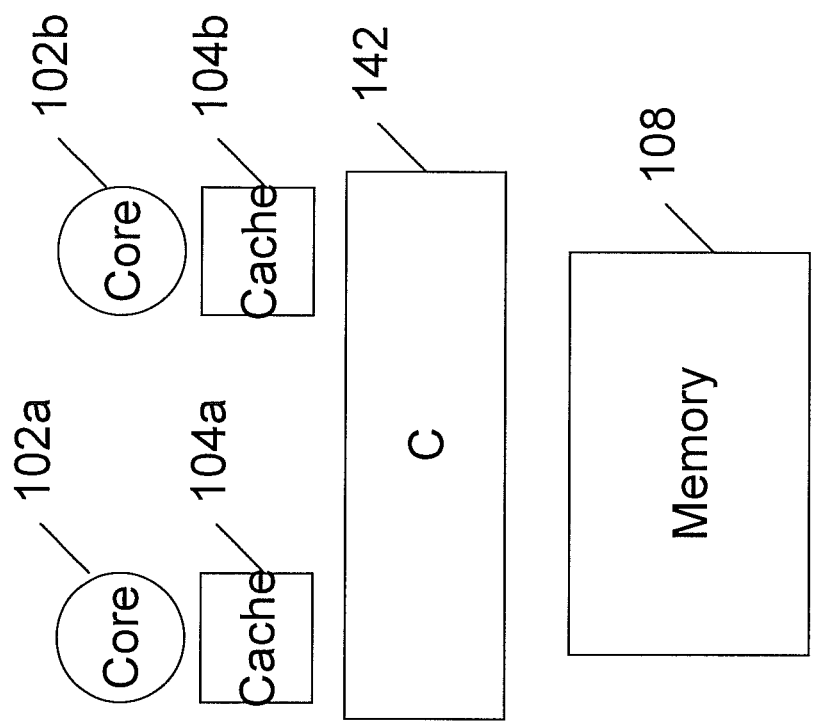
FIG. 1D illustrates processors can communicate using a shared cache.

FIG. 1D illustrates processors can communicate using a shared cache 142 instead of shared bus with some modifications to cache controller hardware; and the system does not require explicit intervention anymore.

A system and method in accordance with the present invention provides at least the following advantages.

Take advantage of an idle or low utilization core in a multi-core system.

Run prefetch algorithm on software on that core.

The algorithm is triggered by miss requests, from the main application thread(s), potentially running on a different core, which are visible on the shared coherent interconnect between the cores.

The prefetched data is brought into its cache (private cache is the preferred embodiment).

The data is sent to the main application upon a demand fetch, via either data intervention on the coherence bus or a shared cache level.

Since prefetch algorithms are executed on a different thread, preferably on a different core, they do not slow down the main application.

Since the prefetched data is brought into a lower level shared cache or a private cache belonging to a different processor, the private caches of the processor running the main application are not polluted.

Since prefetching is done in software as a different thread, there is no need for a sophisticated compiler or profiling runs when compiling the main application.

Since the prefetch algorithm is implemented in software, the prefetching technique can be as diverse as the applications that use them. The prefetch algorithm employed could be varied for each application, or, even, each phase of each application.

The prefetch algorithm software could be supplied by the application itself or be chosen from a library.

The prefetch algorithm can be run on a differently lightly loaded or idle core, thereby not drastically affecting any intensively used resources.

The prefetch algorithm can be adapted to the core, utilization. Some prefetch algorithms, such as streaming prefetchers, require very simple algorithms that do not use much of the processor resources. They could be preferred if the core the prefetch algorithm is run on is relatively heavily used.

The prefetch aggressiveness can be adapted to the available bandwidth. The prefetch algorithm could be sensitive to the memory bandwidth usage and flexible in its prefetching aggressiveness.

In one embodiment, the prefetch algorithms n on a one special purpose core on the chip or a few special purpose cores on the chip, thereby freeing most of the cores from requiring enhancements to support prefetching.

In another embodiment, the prefetch algorithms run on a general purpose core on the chip, thereby freeing other cores from requiring enhancements to support prefetching.

Each of the advantages will be described in detail hereinbelow.

1. Take advantage of an idle or low utilization core.

In an embodiment a core, preferably a core "nearest" to the core where the main application is to be scheduled, should be used for the purposes of running the prefetching thread. Here, what is meant by "nearest" is the core can be communicated with in the least amount of time. In a shared bus or cross bar interconnect architecture the distances between the cores on the chip may be identical, however in a shared ring or a network topology, the communication delays between the various cores might not be equal. In a different embodiment, a small subset of cores on a CMP system could be designated to be "snoop-based prefetching capable" and be used for the purposes of running prefetch algorithms. The advantage of the latter embodiment is that the extra hardware resources needed are restricted to a small set of cores rather than all cores in the CMP system, thereby reducing hardware logic and area overhead. In the latter embodiment these "snoop-based prefetching capable" cores should be evenly distributed across the chips, rather than laying them out n a concentrated fashion. The reasoning behind such a layout is that a core running a main thread should be able to use a "nearby" prefetching core so that the prefetched data can be quickly supplied to the main application.

2. Run prefetch algorithms in software on that core.

As the number of processors in a CMP grows from tens to hundreds, a diverse set of applications are expected to make use of these resources. The application diversity implies that the prefetch algorithms that work well for the various applications will be diverse as well. Each application could supply its own preferred prefetching software. However, preferred embodiment, a precompiled, software library of prefetch algorithms is utilized. The operating system either pairs an application with a prefetch algorithm from the library, potentially a conservative prefetch algorithm that can dynamically detect what style of prefetching to apply, or the user could send hints to the operating system about which prefetch algorithm to pair with the given application. The operating system schedules the two threads, the main application thread and the prefetching thread, simultaneously. Preferably, the main thread runs on one core, while the prefetch thread runs on a different core on the same chip.

As an example, an application that is known to perform better with stride prefetchers could use a software-based stride prefetch algorithm, in fact, the algorithms, since they run in software, use the regular memory model to store their correlation tables and other such structures, thus avoiding the need for any special or large hardware structures. The prefetch algorithms are implemented using the same ISA as the main thread and therefore need no special compiler. Since these algorithms are independent of the input data set of the application, they can be compiled separate from the application, which allows them to be grouped into a precompiled library. Of course, these prefetch algorithms should allow some parametric knobs that the application or the compiler can select, for example, knobs that set how aggressive the algorithm can be with prefetch distances, or knobs that allow the prefetch aggressiveness to be sensitive to the memory bandwidth utilization.

3. Triggered by miss requests from the main application thread(s), potentially running the prefetch algorithms n a different core.

In an embodiment, the prefetch algorithms are triggered by main application's cache misses at the L2 cache level, or, more generally, the cache level closest to the processors that maintains coherence information. These miss addresses are physical addresses. To the prefetch algorithm they are just inputs which are to be used to generate outputs, which are also physical address. In alternate embodiments, for example, where the stream of demand miss addresses is not sufficient to feed the prefetch algorithm, more aggressive hardware implementations should be implemented. The stream of demand access addresses, instead of demand miss addresses, could be provided via specialized busses to the processor running the prefetch algorithm. However, in a preferred embodiment, the existing coherence interconnect, which already exists in many shared memory multiprocessor systems is utilized for this communication.

4. The misses are visible on the shared coherent interconnect between the cores.

Figure 2:
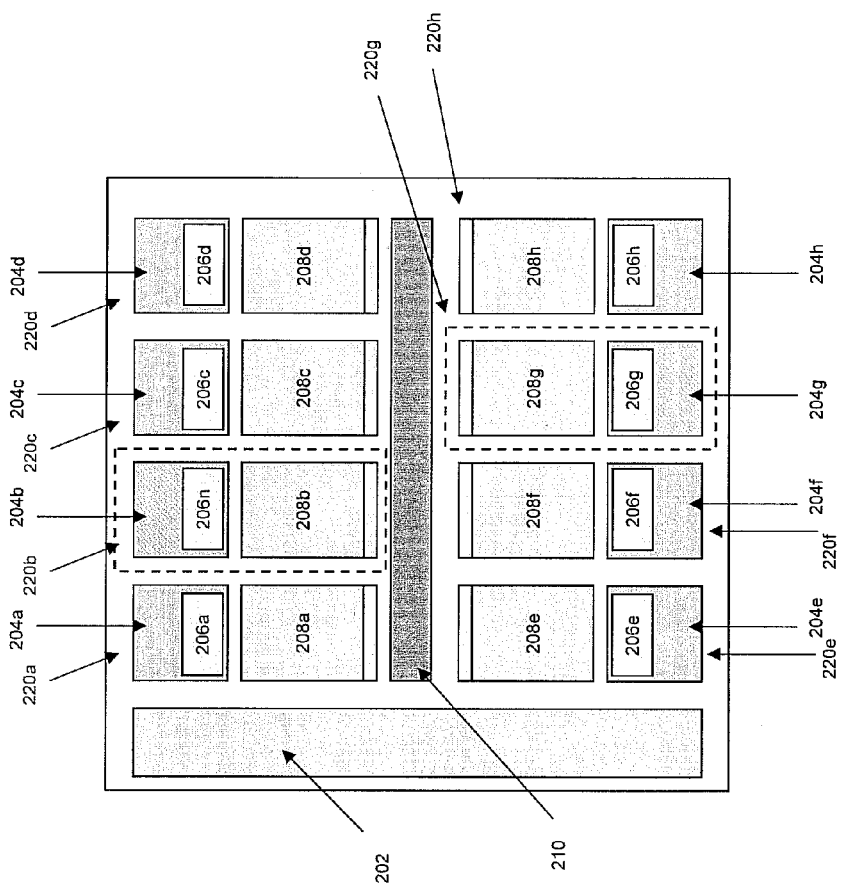
FIG. 2 is a block diagram of an embodiment of a chip multiprocessing system.

In a CMP, the cores, typically, have a private L1 cache(s) and either a private, partitioned or shared L2 cache. The coherent interconnect is, typically, between the L2 caches and the next level of memory hierarchy. The misses coming out of the L2 cache of the one core closest to the processor, maintain the coherence state corresponding to the cache lines. The misses coming out of the L2 cache of the one core are visible to the other L2s' cache controllers so that they can update their coherence states, or provide data, or both. FIG. 2 is a block diagram of an embodiment of a chip multiprocessing system 200. The CMP system 200 includes a memory controller and external bus interface 202. There is a plurality of processor cores 204a-204h. Each processor core 204a-204h includes an L1 cache 206a-206h. Each of the plurality of processor cores 204a-204h includes in this embodiment a private L2 cache 208a-208e associated therewith.

One of the processor cores 204a-204h, its L1 cache 206a-206h and its associated private L2 cache 208a-208h together form a central processing unit (CPU) 220. As is seen the system 200 also includes a coherent on-chip bus 210 to facilitate communication between the CPUs 220a-220h. In n embodiment some or all of the CPUs 220a-220h are provided with hardware support to run one or more prefetch algorithms. As is seen CPUs 220b and 220g are enhanced with the hardware support. However on of ordinary skill in the art recognizes that any combination of or all of the CPUs 220a-220h could be enhanced to include this hardware support. In addition, the enhanced CPUs 220b and 220g could be implemented in a special purpose accelerator thereby allowing each of their cores 204a and 204h to be smaller than the cores in the general CPUs. The operation of a system and method in accordance with the present invention including the hardware support is described in more detail hereinbelow in conjunction with the accompanying Figures.

Figure 3A:
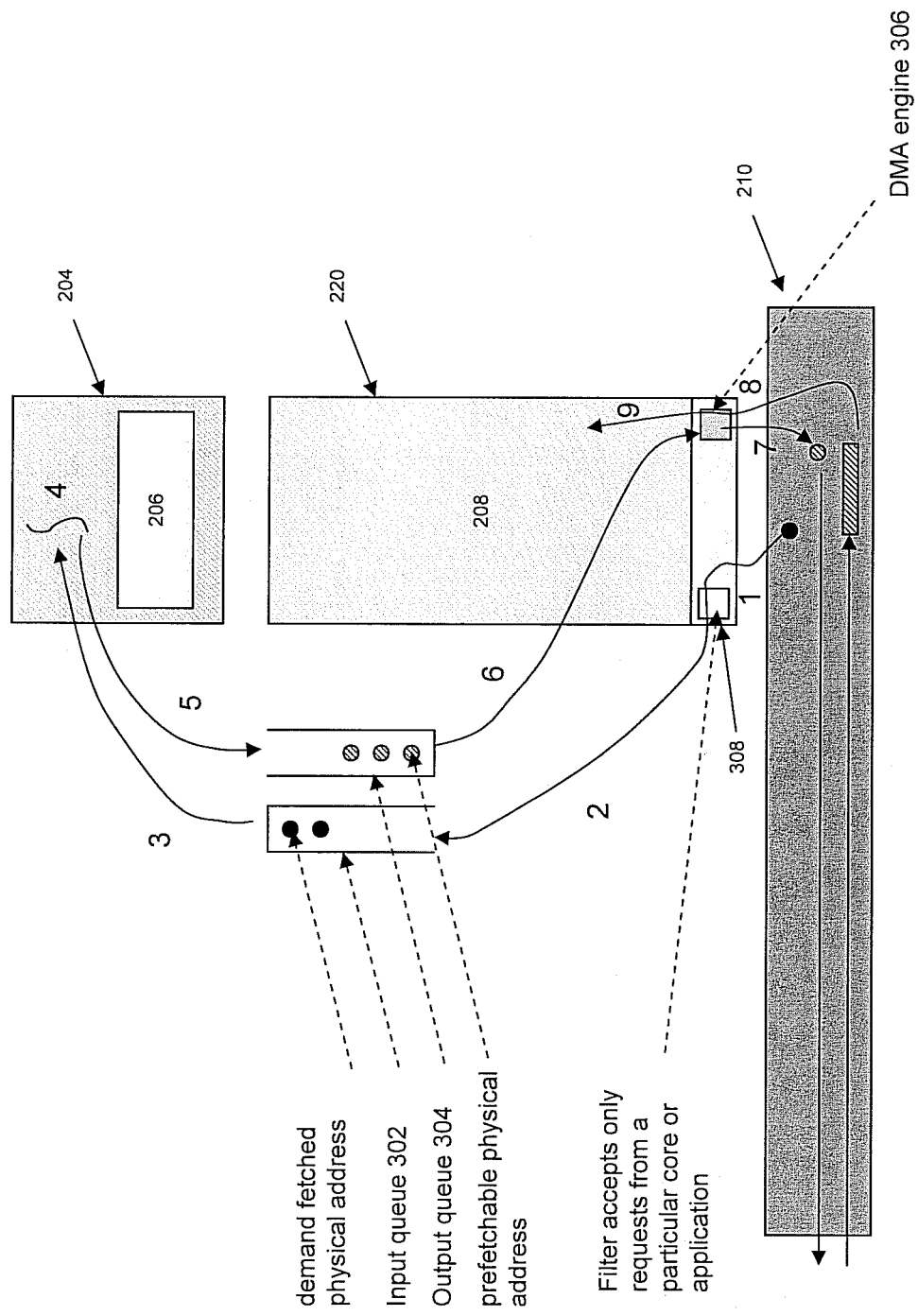
FIG. 3A illustrates a CPU that includes hardware support for implementing a system and method in accordance with an embodiment.
Figure 3B:
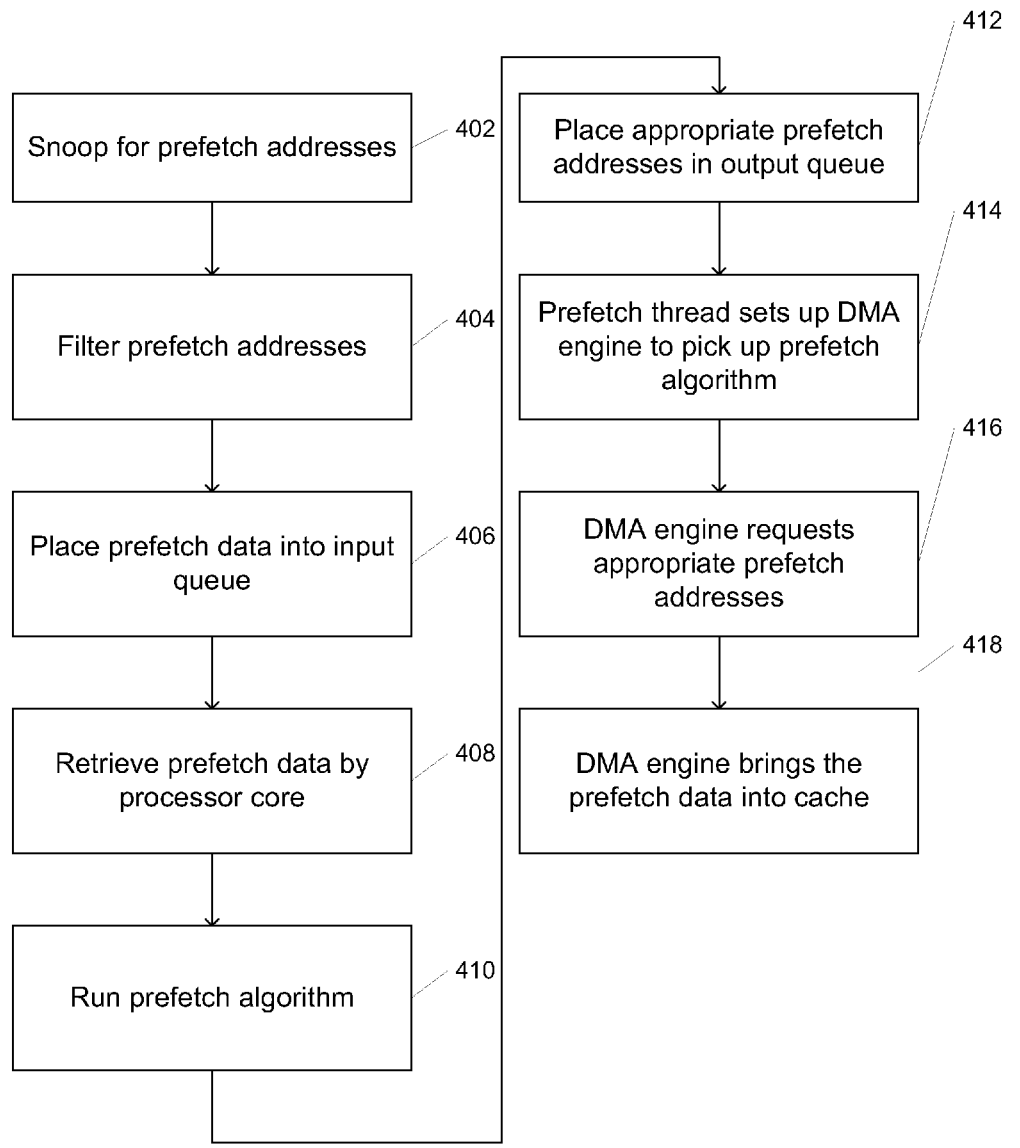
FIG. 3B is a flowchart of the operation of the CPU of FIG. 3A.

FIG. 3A illustrates a CPU 220 that includes hardware support for implementing a system and method in accordance with an embodiment. As is seen the CPU 220 includes input queue 302, an output queue 304 and a DMA engine 306. FIG. 3B is a flowchart of the operation of the CPU of FIG. 3A.

To describe the operation of the snoop based prefetch mechanism refer now to the following description in conjunction with FIGS. 3A and 3B. Referring to FIGS. 3A and 3B together, in an embodiment, the coherent bus 210 is snooped for prefetch addresses based upon a demand by the core (not shown) running the main application, via step 402. Next, a filter 308 filters the prefetch addresses to ensure that only requests from the core running the main application, via step 404 are retrieved and the prefetch data is placed into the input queue 302, via step 406. Next, the prefetch data is retrieved by the prefetch thread in the core 204, via step 408 and the prefetch algorithm is run, via step 410. Thereafter, the appropriate prefetch addresses are placed into the output queue 304, via step 412. The prefetch algorithm thread then sets up the DMA engine 306 to pick up the prefetch algorithm, via step 414. The DMA engine 306 then makes a request to the bus 210 to obtain the appropriate prefetch addresses, via step 416. The DMA engine 306 then brings the prefetch data into the cache 208, via step 418.

In the preferred embodiment, this coherence traffic is, firstly, filtered by the cache controller for the core running the prefetch algorithm to extract only the requests being made by the core running the main application. These filtered requests are then supplied to the prefetch algorithm using an input queue in hardware. The prefetch algorithm uses memory mapping to access the input queue containing the L2 miss addresses of the main application. The prefetching software uses these physical addresses as input and generates another set of physical addresses which are to be prefetched.

Since, architecturally, the load or ouch instructions in an ISA need virtual addresses, and since the prefetching core does not have any simple way to convert these physical, prefetch addresses to the virtual address space of the main application, in the preferred embodiment, it simply adds these prefetch addresses to a memory-mapped output queue in hardware. In another embodiment, the prefetching core uses the real-address mode to make prefetch requests using the physical addresses directly. In the preferred embodiment for safety an input queue is needed to accept physical addresses as inputs to the prefetch algorithm and an output queue to place algorithmically generated prefetch addresses.

In the preferred embodiment, the DMA engine is programmed to read physical addresses from the memory-mapped output queue, load corresponding data from the memory and install it in the appropriate L2 cache. The cache controller must be modified to accept data brought in by the DMA engine. A conventional technique of installing lines in a cache is referred to as "Cache Inject". In another embodiment, the cache controller is modified to be capable of reading physical addresses from the output queue and making requests to the memory subsystem itself. An optimization is to not prefetch data that is found to already reside on the CMP system, because it would only lead to, potentially, unnecessary data movement: the line might already be in the cache closest to the one using it and even otherwise, it could be supplied via intervention from its existing location on-chip.

Either all cores on the chip have such input and output queues, DMA engines and modified cache controller hardware, or only the cores designated to be "snoop-based-prefetching-capable" have these structures. In an alternate embodiment, the hardware input and output queues shown in FIG. 3 may be avoided by memory mapping these queues.

5. Bring in the prefetched data into its cache.

In the preferred embodiment of the idea, the data brought in by the prefetch algorithm is placed in the prefetching core's private L2 cache. This avoids the problem of prefetches polluting the private L2 cache of the core running the main application. However, even in the case where the main application and the prefetch algorithm run on cores sharing an L2, this invention provides the effect of prefetching. It brings the data into a lower level of cache in the hierarchy, for example, the L3, if it exists, or, to the L2 itself. If an L3 exists, it being typically much larger than the L2 is more immune to cache pollution effects of prefetching. A preferred optimization to the invention in case of shared L2 caches, when there is such an L3 in the system, is not to bring the prefetched line into the shared L2, but rather to only bring it into the L3.

6. Send the data to the main application via data intervention on the coherence bus when demand fetched or via a shared cache level.

The data intervention techniques which have been implemented in conventional processing systems can be used to provide the prefetched data to the core running the main application. Such intervention, though slower than when the data is pre-installed in the main core's cache, is still better in of hiding latency of an access to the lower level of the memory hierarchy. If there is a shared lower level cache that the processors running the main application thread and the prefetching thread share, then that cache would attempt to provide the prefetched data if intervention does not.

Implementation Issues

When prefetching from a never before visited page, the easy solution is for the prefetch algorithm to recognize the page crossing and stop prefetching beyond it. This solution is restrictive because the prefetch algorithm cannot work sufficiently ahead of the main thread, unless large pages are used. Accordingly, it is preferable that large pages be used when using non-history-based prefetching techniques.

In a preferred embodiment, the hardware in the processor running the prefetch algorithm, preferably the hardware making the prefetch requests (DMA engine or output queue in FIG. 3), keeps track of all the current physical pages belonging to the main application in a table (physical-pages-in-use table). Prefetch accesses compare the physical page of the prefetch address with the physical pages in the table, and only on a match is the prefetch request made on the interconnect.

When the operating system switches the virtual-to-physical mapping of a page, it traditionally sends out a message on the interconnect bus for invalidation. In an embodiment, a special message identifying the physical page involved in the page swap is also sent on the interconnect bus. All the processors running the prefetch algorithm remove the physical page from the table holding the physical page if they have that entry in table. This ensures that the hardware in the processor running the prefetch algorithm does not send prefetches to pages that are not owned by the main application.

If sending an explicit command on the ink connect bus with the physical page address of the page being swapped is an instruction set architecture change that is not feasible in a design, an alternative, albeit somewhat conservative option, is to use some of the bits that match between physical and virtual addresses to identify if a potential virtual page being swapped out might correspond to any physical page in the prefetching hardware. If it does, those physical pages are removed from the physical-pages-in-use tables. This is conservative, but needs fewer ISA changes. An even more conservative; technique is to simply remove all entries in the physical-pages-in-use tables in all prefetching cores when a virtual page is swapped out.

In an embodiment any demand misses from the main application that also show up at the prefetching core are compared with pre-computed prefetch addresses. If the demand fetch is found to be an address that was part of a prefetch sequence yet to be issued, or an address for which a prefetch has been recently issued, or an address that invalidates the current prefetch path, the prefetch algorithm makes appropriate adjustments. If the prefetching is deemed to be correct but too slow, either appropriate increases in prefetch distance are made or prefetching is stopped to avoid any increase in memory bandwidth pressure. If the prefetching is deemed to be wrong, the algorithm truncates the prefetch sequence to conserve bandwidth.

Since the prefetching core brings in the prefetched into a private L2 cache, whenever possible, this mechanism works well when prefetching is predictable but traditional prefetching (from the same core that is running the main application) causes cache pollution if prefetched lines share space with demand-fetched lines. Such scenarios provide a good opportunity to apply this mechanism.

If a programmer of the main application can see prefetch opportunities which traditional prefetch techniques cannot effectively utilize, he or she may write highly effective prefetch algorithms that can then run on a different core and make prefetch requests to the memory. Accordingly, the main application cache is not polluted and the pressure is reduced on the interconnect by making requests from a different port on the interconnect compared to the main application.

To keep the bandwidth low, the prefetch algorithm could attempt to only retrieve high-confidence prefetch addresses and be quite conservative in establishing and continuing a prefetch sequence. Since the algorithm if implemented in software such behavior can be parameterized and set by the OS or a machine manager, with respect to expected load on the system memory bandwidth. For example, if the system load is expected to be heavy, the prefetch algorithm could be relatively more conservative; if the system load is expected to be low, the prefetch algorithm could be more aggressive.

Conclusion

In an embodiment, a computer system comprises of at least two processing elements, one processing element processes applications and the other processing element processes algorithms to assist the former processing element in optimizing memory access overhead. The system includes a facility that captures the sequence of addresses that miss in the cache for the first processing element and places them in a storage array that the second processing element can access. The second processing element runs one or more assist algorithms using the sequence of addresses from the storage array to generate a sequence of prefetch addresses. The second processing element issues prefetch requests for those prefetch addresses to the system memory and the prefetched data is provided to the first processing element in the event that the makes a request for that data.

Accordingly, a snooped based prefetch mechanism is provided that effectively prefetches data in a computer system capable of running more than one thread simultaneously. This mechanism has a small overhead while minimizing pollution of the associated cache and without needing a sophisticated compiler of profiling runs.

Although the present in ion has been described in accordance with the embodiments shown, one of ordinary skill in the art will readily recognize that there could be variations to the embodiments and those variations would be within the spirit and scope of the present invention. A system and method in accordance is applicable to any multiprocessing environment and not just a CMP system. However in a CMP system, the physical nearness of the prefetched data and the cache needing it make it much easier for this prefetching scheme to be timely and, therefore, effective in such cases. Accordingly, many modifications may be made by one of ordinary skill in the art without departing from the spirit and scope of the appended claims.

What is claimed is:

1. A computer system comprising:

a memory;

a first core having a first cache and configured to process an application;

a coherency bus connecting the first core to the memory and to a second core, the coherency bus configured to make visible to a cache controller of the second core a sequence of addresses of the application that miss the first cache in the first core;

an input queue mapped to the memory for storing, by the cache controller, the sequence of addresses;

instructions, stored in the second core, for generating prefetch addresses from the input queue;

instructions, stored in the second core, for issuing prefetch requests to the memory for the prefetch addresses;

instructions, stored in the second core, for storing the prefetch addresses in an output queue mapped to the memory; and instructions, stored in the second core for providing, responsive to a request by the first core for an address corresponding to a prefetch address, prefetch data associated with the prefetch address to a second cache in the second core, wherein the first core retrieves the prefetch data from the second cache via the coherency bus.

2. The processing system of claim 1 wherein the second cache is shared by the first core and the second core.

3. The processing of claim 1 wherein the second cache is a private cache accessible by the first core.

4. The processing system of claim 1 wherein the prefetch data is provided to the application based on a demand fetch.

5. The processing system of claim 4 wherein the demand fetch is provided via the coherency bus.

6. The processing system of claim 4 wherein the demand fetch is provided via a shared cache level.

\* \* \* \* \*